United States Patent
Derose et al.

(10) Patent No.: US 9,356,300 B2
(45) Date of Patent: May 31, 2016

(54) FUEL CELL ELECTRODE INTERCONNECT CONTACT MATERIAL ENCAPSULATION AND METHOD

(71) Applicant: DELPHI TECHNOLOGIES, INC., Troy, MI (US)

(72) Inventors: Anthony J. Derose, Rochester, NY (US); Karl J. Haltiner, Jr., Fairport, NY (US); Russell A. Gudyka, Rochester, NY (US); Joseph V. Bonadies, Clarkston, MI (US); Thomas W. Silvis, Flushing, MI (US)

(73) Assignee: Delphi Technologies, Inc., Troy, MI (US)

( * ) Notice: Subject to any disclaimer, the term of this patent is extended or adjusted under 35 U.S.C. 154(b) by 248 days.

(21) Appl. No.: 14/036,342

(22) Filed: Sep. 25, 2013

(65) Prior Publication Data

US 2015/0086897 A1     Mar. 26, 2015

(51) Int. Cl.
*H01M 8/02*     (2006.01)
*H01M 8/00*     (2006.01)
(Continued)

(52) U.S. Cl.
CPC .......... *H01M 8/0226* (2013.01); *H01M 8/0202* (2013.01); *H01M 8/0223* (2013.01);
(Continued)

(58) Field of Classification Search
CPC ... H01M 8/10; H01M 8/0202; H01M 8/0223; H01M 8/0282; H01M 8/0271; H01M 8/0297; H01M 8/0226
See application file for complete search history.

(56) References Cited

U.S. PATENT DOCUMENTS

| 7,718,295 B2 | 5/2010 | Haltiner, Jr. et al. |
| 7,754,367 B2 | 7/2010 | Haltiner, Jr. et al. |

(Continued)

FOREIGN PATENT DOCUMENTS

| EP | 1616657 A1 | 1/2006 |
| WO | WO98/36464 | 8/1998 |

(Continued)

OTHER PUBLICATIONS

Weil KS: "High-Temperature Electrical Testing of a Solid Oxide Fuel Cell Cathode Contact Material", Journal of Materials Engineering and Performance, ASM International, Materials Park, OH, US, vol. 13, No. 3, Jun. 1, 2004; pp. 309-315 XP001220864, DOI: 10.1361/10599490419289.

(Continued)

*Primary Examiner* — Kenneth Douyette
(74) *Attorney, Agent, or Firm* — Thomas H. Twomey (57) ABSTRACT

A fuel cell stack includes a plurality of fuel cell cassettes each including a fuel cell with an anode and a cathode. Each fuel cell cassette also includes an electrode interconnect adjacent to the anode or the cathode for providing electrical communication between an adjacent fuel cell cassette and the anode or the cathode. The interconnect includes a plurality of electrode interconnect protrusions defining a flow passage along the anode or the cathode for communicating oxidant or fuel to the anode or the cathode. An electrically conductive material is disposed between at least one of the electrode interconnect protrusions and the anode or the cathode in order to provide a stable electrical contact between the electrode interconnect and the anode or cathode. An encapsulating arrangement segregates the electrically conductive material from the flow passage thereby, preventing volatilization of the electrically conductive material in use of the fuel cell stack.

16 Claims, 5 Drawing Sheets

(51) Int. Cl.
*H01M 8/10* (2016.01)
*H01M 8/12* (2016.01)

(52) U.S. Cl.
CPC .......... *H01M8/0271* (2013.01); *H01M 8/0282* (2013.01); *H01M 8/0297* (2013.01); *H01M 8/10* (2013.01); *H01M 2008/1293* (2013.01)

(56) References Cited

U.S. PATENT DOCUMENTS

| | | |
|---|---|---|
| 8,048,587 B2 | 11/2011 | Simpkins et al. |
| 8,197,981 B2 | 6/2012 | Kelly et al. |
| 2005/0061151 A1* | 3/2005 | Rodrigo et al. ................... 96/15 |
| 2007/0037031 A1* | 2/2007 | Cassidy ................ C22C 29/005 429/457 |
| 2008/0032172 A1 | 2/2008 | Mukerjee et al. |
| 2010/0075191 A1 | 3/2010 | Nelson et al. |
| 2010/0119917 A1* | 5/2010 | Kumar et al. ................... 429/35 |
| 2011/0269059 A1 | 11/2011 | Mukerjee |
| 2012/0094201 A1 | 4/2012 | Haltiner, Jr. et al. |
| 2012/0258241 A1* | 10/2012 | Tucker et al. ................... 427/77 |

FOREIGN PATENT DOCUMENTS

| | | |
|---|---|---|
| WO | WO9840921 | 9/1998 |
| WO | WO03007403 A1 | 1/2003 |

OTHER PUBLICATIONS

EP Search Report Dated Jan. 30, 2015.

* cited by examiner

FUEL CELL ELECTRODE INTERCONNECT CONTACT MATERIAL ENCAPSULATION AND METHOD

GOVERNMENT-SPONSORED STATEMENT

This invention was made with the United States Government support under Contract DE-NT003894 awarded by the U.S. Department of Energy. The Government has certain rights in this invention.

TECHNICAL FIELD OF INVENTION

The present invention relates to fuel cell stacks; more particularly, to solid oxide fuel cell stacks; and most particularly, to an arrangement and method for encapsulating an electrically conductive material used to ensure adequate electrical contact between an electrode interconnect an electrode of the fuel cell stack.

BACKGROUND OF INVENTION

Fuel cells are used to produce electricity when supplied with fuels containing hydrogen and an oxidant such as air. A typical fuel cell includes an ion conductive electrolyte layer sandwiched between an anode and a cathode. There are several different types of fuel cells known in the art, one of which is known as a solid oxide fuel cell or SOFC.

In a typical SOFC, an oxidant, for example air, is passed over the surface of the cathode and a fuel containing hydrogen is passed over the surface of the anode opposite that of the cathode layer. Oxygen ions from the air migrate from the cathode layer through the dense electrolyte layer in which it reacts with the hydrogen and CO in the fuel, forming water and $CO_2$ and thereby creating an electrical potential between the anode layer and the cathode layer of about 1 volt.

Each individual SOFC is mounted within a metal frame, referred to in the art as a retainer, to form a cell-retainer frame assembly. The individual cell-retainer frame assembly is then joined to a metal separator plate to form a fuel cell cassette. In order to produce a voltage sufficiently high to be used in a variety of applications, the cassettes are stacked in series to form a fuel cell stack.

Each fuel cell cassette includes a cathode interconnect which serves to define a flow passage which allows the oxidant to flow across the cathode. The cathode interconnect also serves to provide electrical communication from the cathode to an adjacent fuel cell cassette. In order to ensure an adequate electrical contact between the cathode and the cathode interconnect, an electrically conductive material is typically provided between the cathode and the cathode interconnect. However, electrically conductive materials which are functionally effective and cost effective may be subject to volatizing due to the high operating temperatures that are experienced and due to the oxidant flow which comes into contact with the electrically conductive material. Consequently, the electrically conductive material may lose functionality over the life of the fuel cell stack which may result in unfavorable performance.

Similarly, each fuel cell cassette includes an anode interconnect which serves to define a flow passage which allows the fuel to flow across the anode. The anode interconnect also serves to provide electrical communication from the anode to an adjacent fuel cell cassette via the separator plate. In order to ensure an adequate electrical contact between the anode and the anode interconnect, an electrically conductive material is typically provided between the anode and the anode interconnect. However, electrically conductive materials which are functionally effective and cost effective may be subject to volatizing due to the high operating temperatures that are experienced and due to the fuel flow which comes into contact with the electrically conductive material. Consequently, the electrically conductive material may lose functionality over the life of the fuel cell stack which may result in unfavorable performance.

What is needed is a fuel cell stack and a method which minimizes one or more of the shortcomings as set forth above.

SUMMARY OF THE INVENTION

Briefly described, a fuel cell stack is provided having a plurality of fuel cell cassettes. Each fuel cell cassette includes a fuel cell with an anode and a cathode. Each fuel cell cassette also includes an electrode interconnect adjacent to the anode or the cathode for providing electrical communication between an adjacent fuel cell cassette and the anode or the cathode. The interconnect includes a plurality of electrode interconnect protrusions defining a flow passage along the anode or the cathode for communicating oxidant or fuel to the anode or the cathode. An electrically conductive material is disposed between at least one of the electrode interconnect protrusions and the anode or the cathode in order to provide a stable electrical contact between the electrode interconnect and the anode or cathode. An encapsulating arrangement segregates the electrically conductive material from the flow of the oxidant or fuel in the flow passage, thereby preventing volatilization of the electrically conductive material by the oxidant or fuel in use of the fuel cell stack.

BRIEF DESCRIPTION OF DRAWINGS

This invention will be further described with reference to the accompanying drawings in which.

DETAILED DESCRIPTION OF INVENTION

Figure 1:
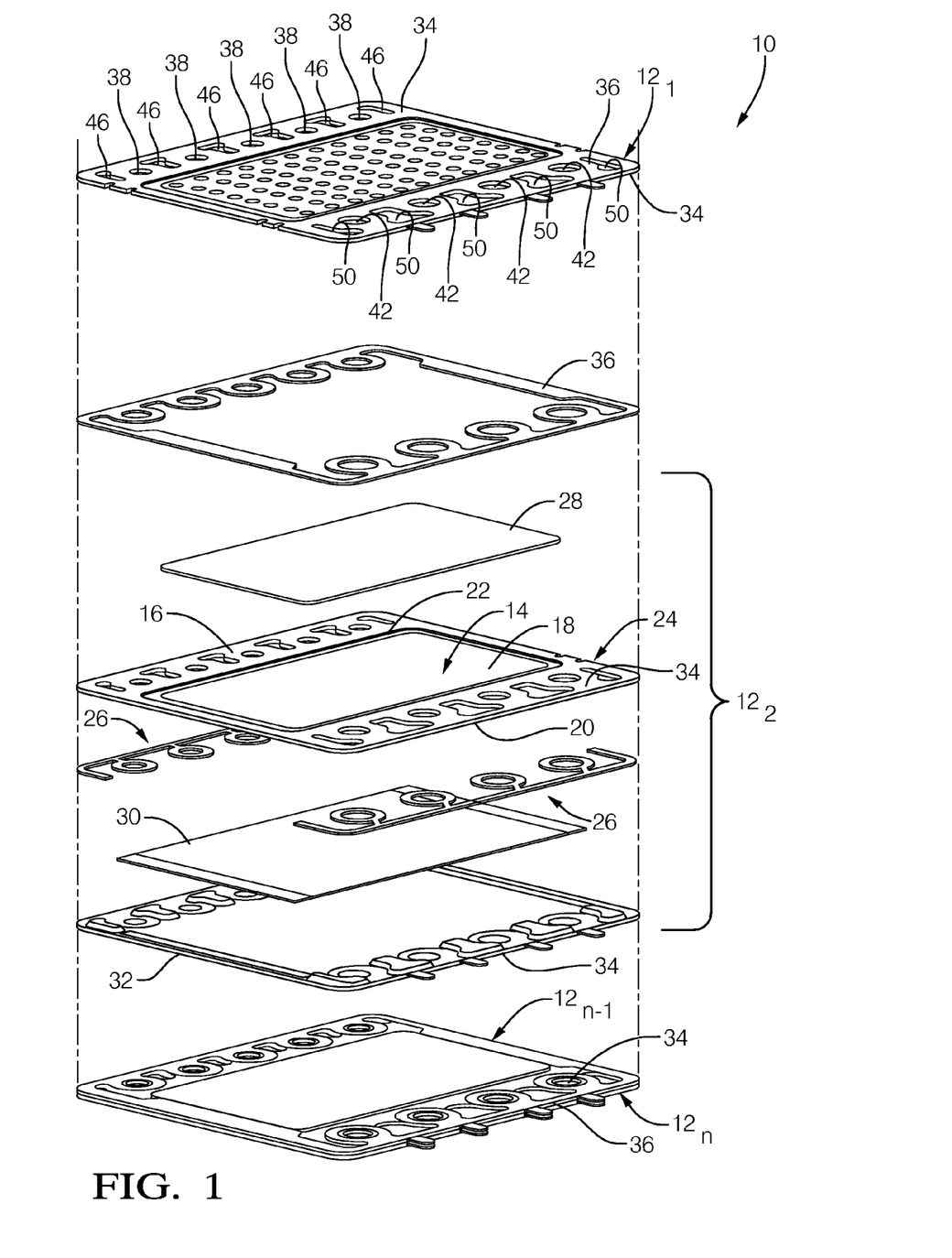
FIG. 1 is an exploded isometric view of a fuel cell stack in accordance with the present invention.
Figure 2:
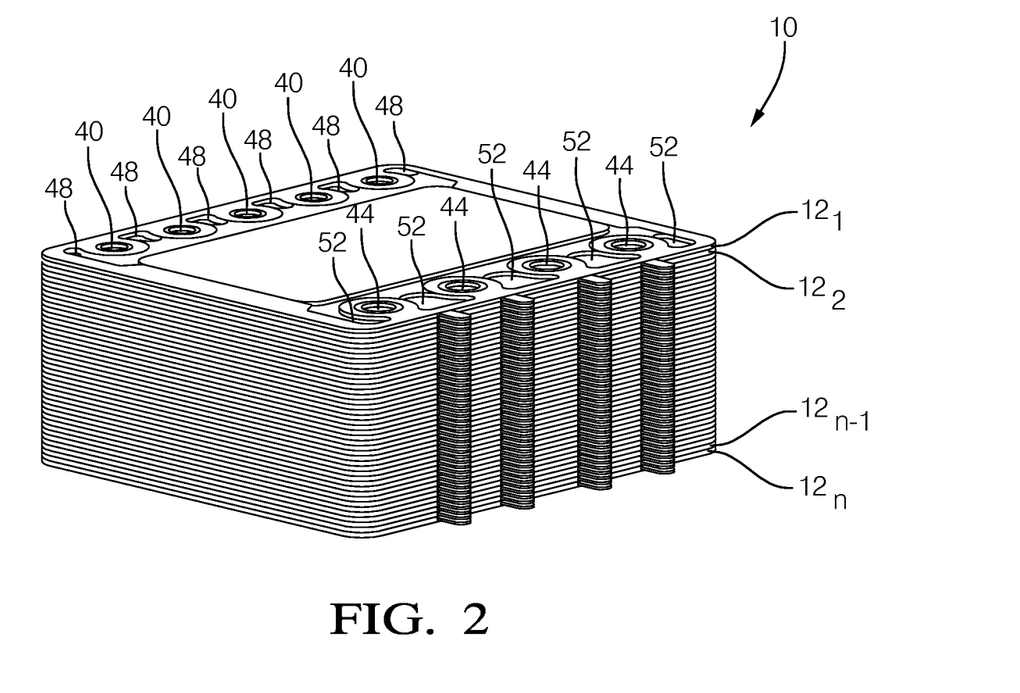
FIG. 2 is an isometric view of the fuel cell stack of FIG. 1, now shown assembled.

Referring to FIGS. 1 and 2, a fuel cell stack 10, which may be a SOFC stack, includes fuel cell cassettes $12_1$, $12_2$, $12_{n-1}$, $12_n$ where n is the number of fuel cell cassettes 12 in fuel cell stack 10 and the number of fuel cell cassettes 12 in fuel cell stack 10 is selected to provide a desired electrical output. Unless reference is being made to a specific fuel cell cassette $12_x$, each of the fuel cell cassettes will be referred to generically as fuel cell cassette 12 from this point forward. Fuel cell cassette 12 includes a fuel cell 14 mounted within a retainer frame 16. Fuel cell 14 includes an electrolyte layer (not shown) sandwiched between a cathode 18 and an anode 20. Retainer frame 16 defines a central retainer frame opening 22. Fuel cell 14 is positioned in central retainer frame opening 22 and joined to retainer frame 16 to form a cell-retainer frame assembly 24. An intermediate process joins together cell-retainer frame assembly 24, anode spacers 26, a cathode interconnect 28, an anode interconnect 30, and a separator plate 32 to form the complete fuel cell cassette 12. Fuel cell cassette 12 includes sealing surfaces 34 which are complementary to sealing surfaces 34 of the adjacent fuel cell cassette 12 to which it is joined. During assembly of fuel cell stack 10, glass composite seal 36 is disposed between sealing surfaces 34 of adjacent fuel cell cassettes 12. Glass composite seal 36 forms a bonded joint to provide a gas tight seal to separate and contain reactants and electrically isolate adjacent separator plates 32.

Still referring to FIGS. 1 and 2, fuel cell cassette 12 includes a plurality of anode supply passages 38 (for clarity, anode supply passages 38 have only been labeled on fuel cell cassette $12_1$ in FIG. 1). Anode supply passages 38 are formed along one side of fuel cell cassette 12 between fuel cell 14 and the outside edge of fuel cell cassette 12. When fuel cell cassettes $12_1$ through $12_n$ are assembled together to form fuel cell stack 10, anode supply passages 38 of each fuel cell cassette 12 are aligned with anode supply passages 38 of adjacent fuel cell cassettes 12 to form a plurality of anode supply chimneys 40. Fuel supplied at one end of fuel cell stack 10 to anode supply chimneys 40 is communicated through anode supply chimneys 40, thereby distributing fuel to each anode 20. Anode supply passages 38 for each fuel cell cassette 12 may be formed at regular intervals along the length of fuel cell cassette 12 to distribute fuel evenly across anode 20.

Fuel cell cassette 12 also includes a plurality of anode exhaust passages 42 (for clarity, anode exhaust passages 42 have only been labeled on fuel cell cassette $12_1$ in FIG. 1). Anode exhaust passages 42 are formed along the side of fuel cell cassette 12 which is opposite to the side with anode supply passages 38. Anode exhaust passages 42 are disposed between fuel cell 14 and the outside edge of fuel cell cassette 12. When fuel cell cassettes $12_1$ through $12_n$ are assembled together to form fuel cell stack 10, anode exhaust passages 42 of each fuel cell cassette 12 are aligned with anode exhaust passages 42 of adjacent fuel cell cassettes 12 to form a plurality of anode exhaust chimneys 44. Anode exhaust chimneys 44 allow anode exhaust from each fuel cell cassette 12 to be communicated to one end of fuel cell stack 10. Anode exhaust passages 42 for each fuel cell cassette 12 may be formed at regular intervals along the length of fuel cell cassette 12 in the same way as anode supply passages 38.

Fuel cell cassette 12 also includes a plurality of cathode supply passages 46 formed along the same side of fuel cell cassette 12 as anode supply passages 38 (for clarity, cathode supply passages 46 have only been labeled on fuel cell cassette $12_1$ in FIG. 1). When fuel cell cassettes $12_1$ through $12_n$ are assembled together to form fuel cell stack 10, cathode supply passages 46 of each fuel cell cassette 12 are aligned with cathode supply passages 46 of adjacent fuel cell cassettes 12 to form a plurality of cathode supply chimneys 48. An oxidant, for example air, supplied at one end of fuel cell stack 10 to cathode supply chimneys 48 is communicated through cathode supply chimneys 48, thereby distributing air to each cathode 18. Cathode supply passages 46 may be formed at regular intervals along the length of fuel cell cassette 12 to distribute air evenly across cathode 18 such that cathode supply passages 46 and anode supply passages 38 are arranged in an alternating pattern along the length of fuel cell cassette 12.

Fuel cell cassette 12 also includes a plurality of cathode exhaust passages 50 formed along the same side of fuel cell cassette 12 as anode exhaust passages 42 (for clarity, cathode exhaust passages 50 have only been labeled on fuel cell cassette $12_1$ in FIG. 1). When fuel cell cassettes $12_1$ through $12_n$ are assembled together to form fuel cell stack 10, cathode exhaust passages 50 of each fuel cell cassette 12 are aligned with cathode exhaust passages 50 of adjacent fuel cell cassettes 12 to form a plurality of cathode exhaust chimneys 52. Cathode exhaust chimneys 52 allow cathode exhaust from each fuel cell cassette 12 to be communicated to one end of fuel cell stack 10. Cathode exhaust passages 50 for each fuel cell cassette 12 may be formed at regular intervals along the length of fuel cell cassette 12 in the same way as cathode supply passages 46 such that such that cathode exhaust passages 50 and anode exhaust passages 42 are arranged in an alternating pattern along the length of fuel cell cassette 12.

Cathode interconnect 28 is disposed adjacent to cathode 18 in order to provide electrical communication between cathode 18 and an adjacent fuel cell cassette 12. Similarly, anode interconnect 30 is disposed adjacent to anode 20 in order to provide electrical communication between anode 20 and an adjacent fuel cell cassette 12 via separator plate 32. Further features and functions of cathode interconnect 28 and anode interconnect 30 will be described in greater detail in the paragraphs that follow.

In general, cathode 18 and anode 20 may be referred to generically as electrodes. Consequently, the paragraphs that follow will refer to cathode 18 and anode 20 generically as electrode 18, 20 unless specific reference is made to either cathode 18 or anode 20. Similarly, cathode interconnect 28 and anode interconnect 30 may be referred to generically as electrode interconnects 28, 30. Consequently, the paragraphs that follow will refer to cathode interconnect 28 and anode interconnect 30 as electrode interconnect 28, 30 unless specific reference is made to either cathode interconnect 28 and anode interconnect 30.

Figure 3:
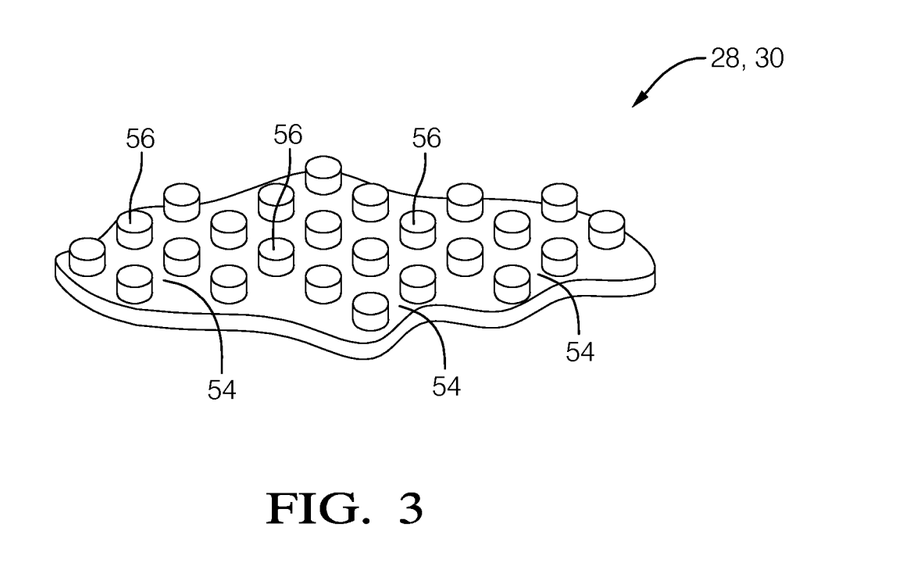
FIG. 3 is an enlarged isometric view of a portion of an electrode interconnect of the fuel cell stack in accordance with the present invention.

Reference will continue to be made to FIG. 1 and additional reference will now be made to FIG. 3, which is a portion of electrode interconnect 28, 30 enlarged to show detail not visible in FIG. 1. It should be noted that electrode interconnect 28, 30 as shown in FIG. 3 is inverted compared to FIG. 1 if electrode interconnect 28, 30 is cathode interconnect 28 and that electrode interconnect 28, 30 is oriented the same as shown in FIG. 1 if electrode interconnect 28, 30 is anode interconnect 30. Electrode interconnect 28, 30 serves to define an electrode flow passage 54 which allows the oxidant to flow across cathode 18 from cathode supply passages 46 to cathode exhaust passages 50 if electrode interconnect 28, 30 is cathode interconnect 28 and allows fuel to flow across anode 20 from anode supply passages 38 to anode exhaust passages 42 if electrode interconnect 28, 30 is anode interconnect 30. Electrode flow passage 54 is defined by a plurality of electrode interconnect protrusions 56 which extend from electrode interconnect 28, 30 toward electrode 18, 20. Electrode interconnect protrusions 56 may be, for example only, about 1 mm wide and about 0.25 mm high. While electrode interconnect protrusions 56 are illustrated as substantially cylindrical, it should be understood that electrode interconnect protrusions 56 may take many other forms. Electrode interconnect 28 also serves to provide electrical communication from electrode 18, 20 to an adjacent fuel cell cassette 12. In order to ensure adequate electrical contact between electrode 18, 20 and electrode interconnect 28, 30, an electrically conductive material 58 (not shown in FIGS. 1 and 3) is provided between electrode interconnect protrusions 56 and electrode 18, 20. Electrically conductive material 58 may include silver and may also include palladium, particularly if electrode interconnect 28, 30 is cathode interconnect 28. Electrically conductive material 58 may include nickel, particularly if electrode interconnect 28, 30 is anode interconnect 30. However, electrically conductive material 58 may be any material suitable for the operating environment that it will be exposed to and which provides suitable electrical contact between electrode 18, 20 and electrode interconnect 28, 30. Electrically conductive material 58 may be applied in paste form, i.e. a mixture of small particles of electrically conductive material 58 and an organic liquid carrier where the particles comprise about 20% to about 70% of the mixture by volume. The organic liquid carrier is then burned off in a sintering process which sinters the particles of electrically conductive material together and to electrode 18, 20 and electrode interconnect 28, 30.

Figure 4:
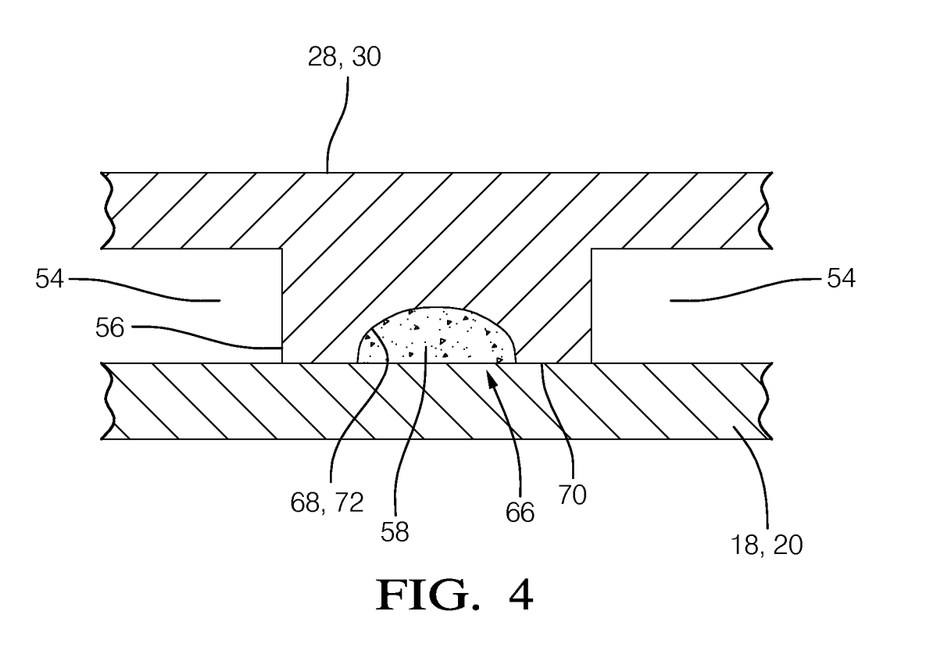
FIG. 4 is a cross-sectional view of a first embodiment of an encapsulating arrangement for an electrically conductive material used to ensure adequate electrical contact between the electrode interconnect and an electrode of the fuel cell stack in accordance with the present invention.

Reference will now be made to FIG. 4 which shows a first embodiment of an encapsulating arrangement 66 which segregates electrically conductive material 58 from electrode flow passage 54, thereby preventing volatilization of electrically conductive material 58 during use of fuel cell stack 10. Encapsulating arrangement 66 includes an electrode interconnect protrusion recess 68 formed centrally within the portion of electrode interconnect protrusion 56 which faces toward electrode 18, 20. Electrode interconnect protrusion recess 68 may be, for example only, about 0.5 mm wide and about 10 µm to about 20 µm high. Electrode interconnect protrusion recess 68 defines a ring-shaped electrode interconnect protrusion surface 70 which surrounds electrode interconnect protrusion recess 68 and which contacts electrode 18, 20. Electrode interconnect protrusion recess 68 also defines a material cavity 72 with electrode 18, 20 which contains electrically conductive material 58 therein, thereby segregating electrically conductive material 58 from electrode flow passage 54. Electrically conductive material 58 may be disposed within material cavity 72 by dispensing electrically conductive material 58 in paste form within electrode interconnect protrusion recess 68 prior to assembly of electrode interconnect 28, 30 to electrode 18, 20. Consequently, electrically conductive material 58 is segregated from electrode flow passage 54 after electrode interconnect 28, 30 is assembled to electrode 18, 20. Alternatively, electrically conductive material 58 may be disposed within material cavity 72 by disposing, for example by printing, electrically conductive material 58 in paste form on electrode 18, 20 prior to assembly of electrode interconnect 28, 30 to electrode 18, 20. Consequently, when electrode interconnect 28, 30 is assembled to electrode 18,20; material cavity 72 will match up with electrically conductive material 58 that has been disposed on electrode 18, 20 and electrically conductive material 58 will be disposed within material cavity 72. While encapsulating arrangement 66 has been described in terms of a single electrode interconnect protrusion 56, it should be understood that encapsulating arrangement 66 may be used with any or all of electrode interconnect protrusions 56.

Figure 5:
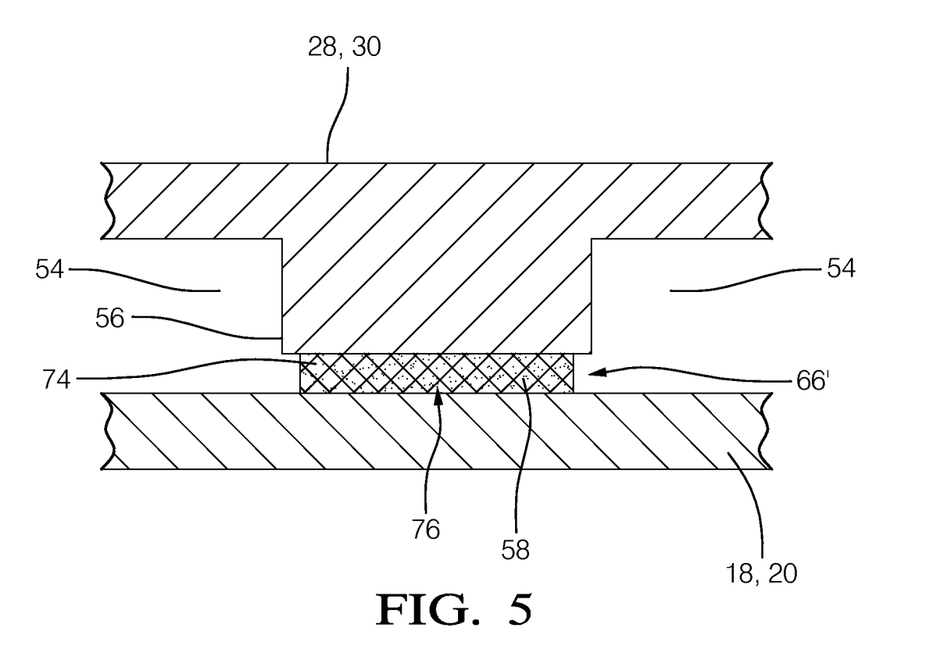
FIG. 5 is a cross-sectional view of a second embodiment of an encapsulating arrangement for the electrically conductive material.

Reference will now be made to FIG. 5 which shows a second embodiment of an encapsulating arrangement 66' which segregates electrically conductive material 58 from electrode flow passage 54, thereby preventing volatilization of electrically conductive material 58 during use of fuel cell stack 10. Encapsulating arrangement 66' includes a contiguous glass structure 74 interspersed with electrically conductive material 58. It should be noted that glass structure 74 is shown in FIG. 5 as a regular repeating pattern of diamonds for illustrative purposes only and that glass structure 74 may take an irregular form which may resemble a foam-like structure. Glass structure 74 together with electrically conductive material 58 forms a glass-electrically conductive material matrix 76 which may be about 35% to about 60% electrically conductive material 58 by volume. Glass structure 74 may have a thickness, for example only, of about 10 µm to about 20 µm. Glass-electrically conductive material matrix 76 may be formed by mixing particles of electrically conductive material 58 with a glass powder and a liquid organic binder to form a conductive particle/glass paste which is represented by electrically conductive material 58/glass structure 74 in FIG. 5. The conductive particle/glass paste may then be applied to either electrode interconnect protrusion 56 or to electrode 18, 20 and then electrode interconnect 28, 30 may be brought together with electrode 18, 20, leaving a sufficient space between electrode interconnect protrusion 56 and electrode 18 to achieve the desired thickness of glass-electrically conductive material matrix 76. Finally, the conductive particle/glass paste is sintered to form glass structure 74, thereby segregating electrically conductive material 58 from electrode flow passage 54. Glass-electrically conductive material matrix 76 will be a solid that will maintain form over the operational life of fuel cell stack 10. While encapsulating arrangement 66' has been described in terms of a single electrode interconnect protrusion 56, it should be understood that encapsulating arrangement 66' may be used with any or all of electrode interconnect protrusions 56.

Figure 6:
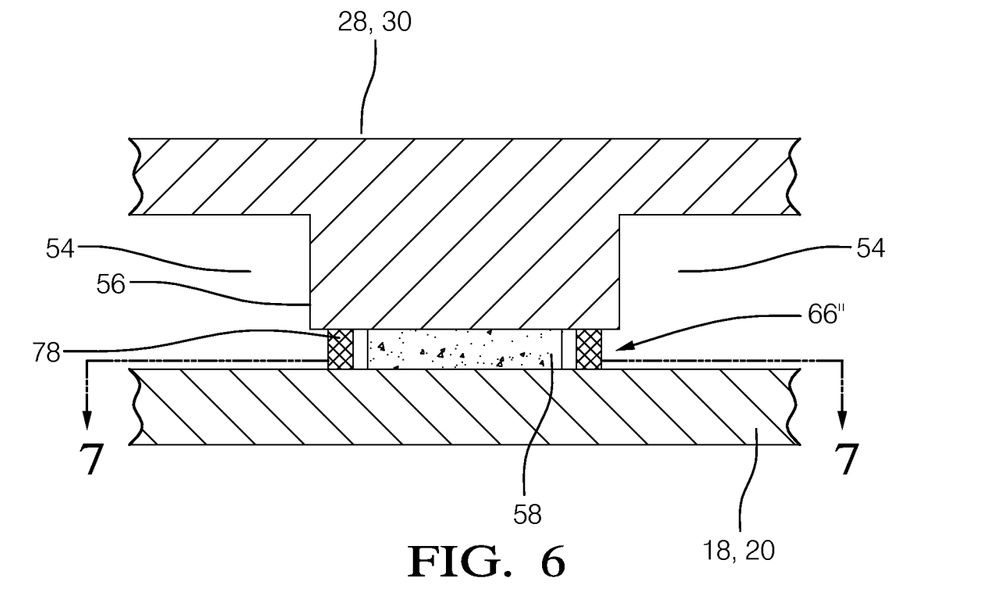
FIG. 6 is a cross-sectional view of a third embodiment of an encapsulating arrangement for the electrically conductive material.
Figure 7:
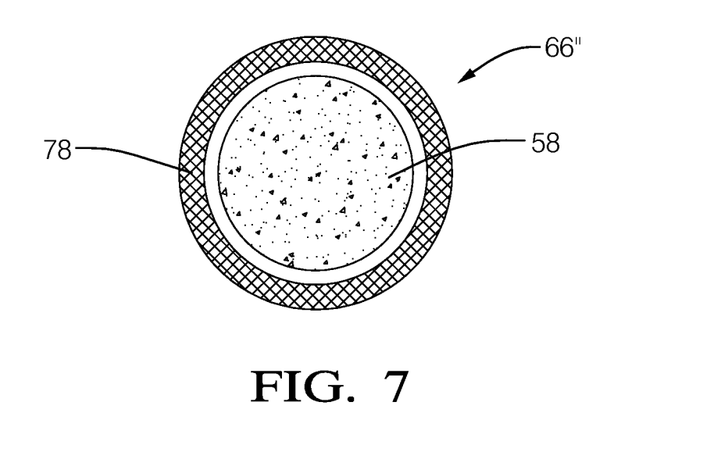
FIG. 7 is a cross-sectional view taken through section line 7-7 of the encapsulating arrangement of FIG. 6.

Reference will now be made to FIGS. 6 and 7 which show a third embodiment of an encapsulating arrangement 66" which segregates electrically conductive material 58 from electrode flow passage 54, thereby preventing volatilization of electrically conductive material 58 during use of fuel cell stack 10. Encapsulating arrangement 66" includes a glass ring 78 which radially surrounds electrically conductive material 58 and which is disposed between electrode interconnect protrusion 56 and electrode 18, 20. Glass ring 78 may have a thickness, for example only, of about 10 µm to about 20 µm. Encapsulating arrangement 66" may be formed by disposing, for example by printing, a glass paste in the form of a ring on either electrode 18, 20 or electrode interconnect protrusion 56. Similarly, electrically conductive material 58 may be disposed in paste form in the shape of a disk on either electrode 18, 20 or electrode interconnect protrusion 56. Next, electrode interconnect 28, 30 may be brought together with electrode 18, 20, leaving a sufficient space between electrode interconnect protrusion 56 and electrode 18, 20 to achieve the desired thickness of electrically conductive material 58 and glass ring 78. Finally, the glass paste is sintered to form glass ring 78, thereby segregating electrically conductive material 58 from electrode flow passage 54. Glass ring 78 will be a solid that will maintain form over the operational life of fuel cell stack 10. While encapsulating arrangement 66" has been described in terms of a single electrode interconnect protrusion 56, it should be understood that encapsulating arrangement 66" may be used with any or all of electrode interconnect protrusions 56.

Figure 8:
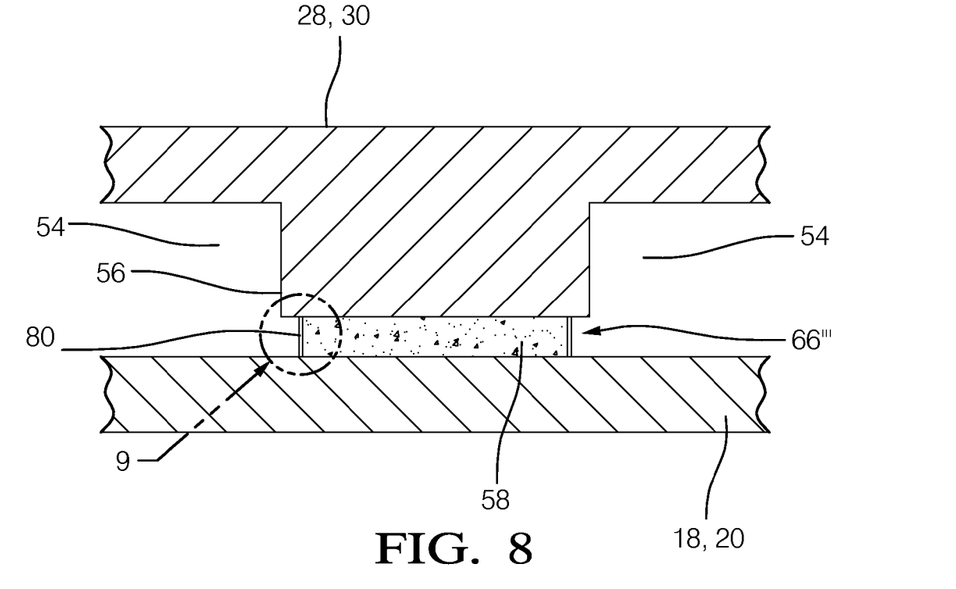
FIG. 8 is a cross-sectional view of a fourth embodiment of an encapsulating arrangement for the electrically conductive material.
Figure 9:
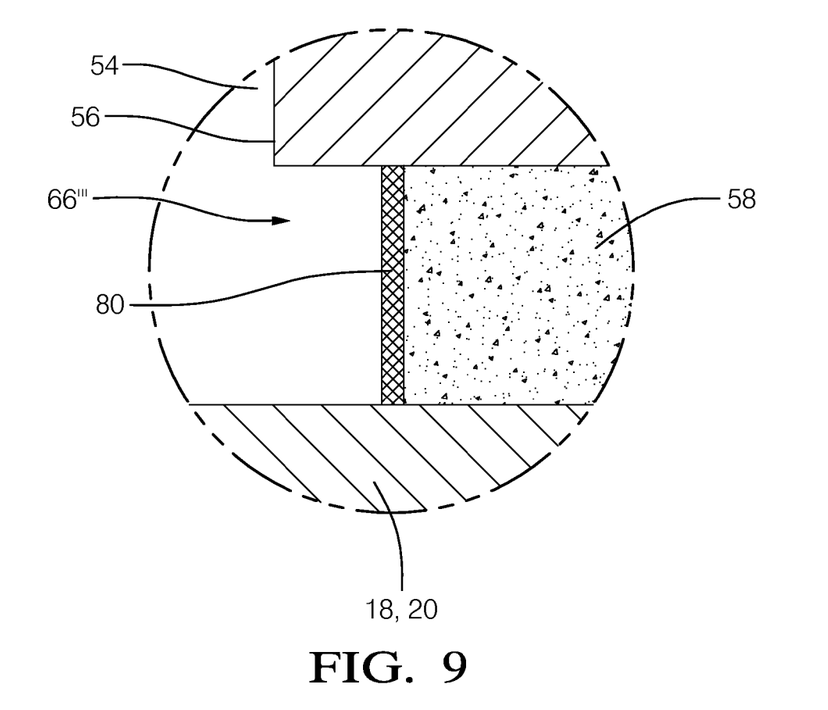
FIG. 9 is an enlarged view of a circle 9 of the encapsulating arrangement of FIG. 8.

Reference will now be made to FIGS. 8 and 9 which show a fourth embodiment of an encapsulating arrangement 66''' which segregates electrically conductive material 58 from electrode flow passage 54, thereby preventing volatilization of electrically conductive material 58 during use of fuel cell stack 10. Encapsulating arrangement 66''' includes a skin 80 which radially surrounds electrically conductive material 58 and which is disposed between electrode interconnect protrusion 56 and electrode 18, 20. Electrically conductive material 58 may have a thickness, for example only, of about 10 µm to about 20 µm. Skin 80 may include silica which may be formed by mixing particles of electrically conductive material 58 with silicon and an organic liquid carrier to form an electrically conductive material/silicon paste which is represented by electrically conductive material 58 in FIG. 8. The silicon may be about 1% to about 10% by volume of the electrically conductive material/silicon paste. The electrically conductive/silicon mixture is then disposed in paste form on either electrode 18, 20 or electrode interconnect protrusion 56 and electrode interconnect 28, 30 is brought together with electrode 18, 20; leaving a sufficient space between electrode interconnect protrusion 56 and electrode 18, 20 to achieve the desired thickness of the paste/silicon mixture. Finally, the electrically conductive material/silicon paste is sintered. As the electrically conductive material/silicon paste is being sintered, the silicon within the paste will oxidize to form silica (silicon oxide) which migrates to the surface of the electrically conductive material/silicon paste that is exposed to electrode flow passage 54 due to thermodynamic principles where the silica will form skin 80 which is contiguous, thereby segregating electrically conductive material 58 from electrode flow passage 54. While encapsulating arrangement 66''' has been described in terms of a single electrode interconnect protrusion 56, it should be understood that encapsulating arrangement 66''' may be used with any or all of electrode interconnect protrusions 56.

While cathode interconnect 28, anode interconnect 30, and separator plate 32 have been illustrated and described as three distinct parts, it should now be understood that the feature of any or all of cathode interconnect 28, anode interconnect 30, and separator plate 32 may be combined to be fewer than three distinct parts.

While electrically conductive material 58 has been illustrated as being disposed between cathode 18 and cathode interconnect 28 and between anode 20 and anode interconnect 30, it should now be understood that electrically conductive material 58 may also be included on the opposite side of cathode interconnect 28 and anode interconnect 30. In this arrangement, electrically conductive material 58 ensures adequate electrical contact between cathode interconnect 28 and separator plate 32 of the adjacent fuel cell cassette 12. Similarly, electrically conductive material 58 also ensures adequate electrical contact between anode interconnect 30 and separator plate 32. Accordingly, any of encapsulating arrangements 66, 66', 66'', 66''' may be equally applied to this location of electrically conductive material 58.

While this invention has been described in terms of preferred embodiments thereof, it is not intended to be so limited, but rather only to the extent set forth in the claims that follow.

We claim:

1. A fuel cell stack having a plurality of fuel cell cassettes, each said fuel cell cassette comprising:
   a fuel cell with an anode and a cathode;
   an electrode interconnect adjacent to one of said anode and said cathode for providing electrical communication between an adjacent said fuel cell cassette and said one of said anode and said cathode, said electrode interconnect having a plurality of electrode interconnect protrusions defining a flow passage along said one of said anode and said cathode for communicating one of an oxidant and a fuel to said one of said anode and said cathode;
   an electrically conductive material disposed between at least one of said plurality of electrode interconnect protrusions and said one of said anode and said cathode in order to provide an electrical contact between said electrode interconnect and said one of said anode and said cathode; and
   an encapsulating arrangement that radially surrounds said electrically conductive material and segregates said electrically conductive material from the flow of said one of said oxidant and said fuel in said flow passage, thereby preventing volatilization of said electrically conductive material by said one of said oxidant and said fuel in use of said fuel cell stack.

2. A fuel cell stack as in claim 1 wherein said electrode interconnect is a cathode interconnect and said plurality of electrode interconnect protrusions define a cathode flow passage for communicating said oxidant to said cathode.

3. A fuel cell stack as in claim 1 wherein said encapsulating arrangement comprises a recess extending into said at least one of said plurality of electrode interconnect protrusions such that said recess in said at least one of said plurality of electrode interconnect protrusions defines a material cavity with said one of said anode and said cathode.

4. A fuel cell stack as in claim 3 wherein said electrode interconnect is a cathode interconnect and said plurality of electrode interconnect protrusions define a cathode flow passage for communicating said oxidant to said cathode.

5. A fuel cell stack as in claim 4 wherein said electrically conductive material comprises silver.

6. A fuel cell stack as in claim 5 wherein said electrically conductive material further comprises palladium.

7. A fuel cell stack as in claim 1 wherein said encapsulating arrangement comprises a glass ring radially surrounding said electrically conductive material and disposed between said at least one of said plurality of electrode interconnect protrusions and said one of said anode and said cathode.

8. A fuel cell stack as in claim 1 wherein said encapsulating arrangement comprises a skin formed on said electrically conductive material.

9. A fuel cell stack as in claim 8 wherein said skin comprises silica.

10. A method of forming a fuel cell stack having a plurality of fuel cell cassettes where each fuel cassette comprises a fuel cell with an anode and a cathode; an electrode interconnect adjacent to one of said anode and said cathode for providing electrical communication between an adjacent said fuel cell cassette and said one of said anode and said cathode, said electrode interconnect having a plurality of electrode interconnect protrusions defining a flow passage along said one of said anode and said cathode for communicating one of an oxidant and a fuel to said one of said anode and said cathode; and an electrically conductive material disposed between at least one of said plurality of electrode interconnect protrusions and said one of said anode and said cathode in order to provide an electrical contact between said electrode interconnect and said one of said anode and said cathode, said method comprising:
   providing an encapsulating arrangement which radially surrounds said electrically conductive material and segregates said electrically conductive material from said flow passage, thereby preventing volatilization of said electrically conductive material in use of said fuel cell stack.

11. A method as in claim 10 wherein said step of providing said encapsulating arrangement comprises:

forming a recess extending into said at least one of said plurality of electrode interconnect protrusions to define a material cavity with said one of said anode and said cathode; and disposing said electrically conductive material within said material cavity.

12. A method as in claim 10 wherein said step of providing said encapsulating arrangement comprises radially surrounding said electrically conductive material with a glass ring disposed between said at least one of said plurality of electrode interconnect protrusions and said one of said anode and said cathode.

13. A method as in claim 12 wherein said step of providing said encapsulating arrangement further comprises:

disposing a ring of glass paste between said at least one of said plurality of electrode interconnect protrusions and said one of said anode and said cathode;

disposing said electrically conductive material between said at least one of said plurality of electrode interconnect protrusions and said one of said anode and said cathode; and sintering said ring of glass paste to form said glass ring.

14. A method as in claim 10 wherein said step of providing said encapsulating arrangement comprises forming a skin on said electrically conductive material.

15. A method as in claim 14 wherein said step of providing said encapsulating arrangement further comprises:

mixing said electrically conductive material with silicon and an organic liquid carrier to form an electrically conductive material/silicon paste;

disposing said electrically conductive material/silicon paste between said at least one of said plurality of electrode interconnect protrusions and said one of said anode and said cathode; and sintering said electrically conductive material/silicon paste after said step of disposing said electrically conductive material/silicon paste to oxidize said silicon to form silica, thereby causing said silica to migrate toward said flow passage and form said skin.

16. A method as in claim 15 wherein said electrically conductive material/silicon paste is about 1% to about 10% silicon by volume.

* * * * *